(12) United States Patent
Moore et al.

(10) Patent No.: US 9,440,217 B1
(45) Date of Patent: Sep. 13, 2016

(54) APATITE SEQUESTRATION OF SELENIUM

(71) Applicant: Sandia Corporation, Albuquerque, NM (US)

(72) Inventors: Robert C. Moore, Edgewood, NM (US); Mark D. Tucker, Albuquerque, NM (US); Patrick V. Brady, Albuquerque, NM (US); Mark J. Rigali, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 268 days.

(21) Appl. No.: 13/890,022

(22) Filed: May 8, 2013

(51) Int. Cl.
| | | |
|---|---|---|
| *B01J 20/02* | (2006.01) | |
| *C02F 1/28* | (2006.01) | |
| *B01J 20/04* | (2006.01) | |

(52) U.S. Cl.
CPC ........... *B01J 20/0292* (2013.01); *B01J 20/027* (2013.01); *B01J 20/0262* (2013.01); *B01J 20/048* (2013.01); *C02F 1/281* (2013.01)

(58) Field of Classification Search
None
See application file for complete search history.

(56) References Cited

U.S. PATENT DOCUMENTS

| | | | | |
|---|---|---|---|---|
| 5,167,938 A | * | 12/1992 | Heaton et al. | 423/2 |
| 5,262,019 A | * | 11/1993 | Snyder et al. | 205/596 |
| 5,521,128 A | * | 5/1996 | Jones et al. | 501/27 |
| 5,826,163 A | * | 10/1998 | Saraceno et al. | 423/258 |
| 5,954,936 A | * | 9/1999 | Snyder et al. | 205/594 |
| 5,965,095 A | * | 10/1999 | Owens et al. | 423/210 |
| 6,527,691 B1 | * | 3/2003 | Moore | 588/253 |
| 6,592,294 B1 | | 7/2003 | Moore | |
| 7,514,004 B1 | | 4/2009 | Brady et al. | |
| 2010/0300977 A1 | * | 12/2010 | Hughes et al. | 210/670 |

* cited by examiner

*Primary Examiner* — Joseph D Anthony
(74) *Attorney, Agent, or Firm* — Daniel J. Jenkins

(57) ABSTRACT

A method for sequestering selenium is disclosed. The method includes contacting selenium with a stannous modified apatite under conditions whereby the selenium is absorbed by the apatite.

9 Claims, 4 Drawing Sheets

APATITE SEQUESTRATION OF SELENIUM

GOVERNMENT RIGHTS

The Government has rights to this invention pursuant to Contract No. DE-AC04-94AL85000 awarded by the U.S. Department of Energy.

FIELD

The invention relates generally to contaminant sequestration, and more particularly to the treatment of selenium in soil, groundwater, streams, materials and fluids, and more specifically to in situ formation of modified apatitic compounds that selectively trap and contain selenium.

BACKGROUND OF THE INVENTION

Selenium in higher concentrations is very toxic. Leakage of selenium from phosphate, coal and other mining operations and subsequent migration away from the containment area continues to be a significant unresolved problem at a number of government and private storage sites. In phosphate, coal and other mining operations, selenium can leach from the overburden, ore, or mine tailings releasing selenium into surface and ground waters. Selenium is taken up by many plants that can be consumed by wildlife, livestock and people resulting in selenium poisoning. Various techniques are used to try to isolate leaking storage containers and contaminated soil to prevent movement of selenium into uncontaminated soil and especially groundwater. As used herein, the term contaminant and contaminated soil will refer to selenium and selenium contaminated soil, respectively.

One approach is simply to attempt to dig up and remove the selenium contaminated soil. This, however, is costly, and disturbance of contaminated soil carries the risk that some selenium will be missed or released and left to migrate further. Excavation also has a negative effect on soil stability. Excessive digging and excavation around waste tanks, for example, has the potential to aggravate selenium transport by damaging heavily corroded containment drums and disturbing already contaminated soil.

Another approach is to establish an impermeable barrier or seal in the soil of a contaminated site in order to prevent migration of contaminants beyond the barriers. Barriers of this sort that are in use at various sites around the United States and abroad include vertical sleeves of steel or plastic placed in trenches surrounding a site. They also include walls formed through the injection of highly pressurized cementatious grout in holes drilled in the soil. Emplacement of such barriers typically causes considerable disturbance to the soil and often there is no convenient way to create a "floor" or continuous barrier beneath the leaking tank or contaminated region. Consequently, the sequestration of the contaminants is incomplete and contaminants continue to migrate downward and may thereafter migrate outward. For areas under waste tanks, waste trenches and certain geological formations, forming a continuous impermeable barrier or seal is difficult and sometimes impossible.

Another approach is to create a permeable, chemically reactive barrier or zone that selectively actively attracts and chemically binds, sorbs, or traps contaminants (i.e., sequestration), while allowing water and other components or contaminants to pass through unaffected.

These chemically reactive materials can be combined with other components to form slurries that harden in the ground, forming semi-permeable reactive barriers. Jet injection processes, for example, are known and used wherein machines pump slurries in holes drilled around the perimeter of a leaking vessel or contaminated site. Additionally, trenches can be dug and backfilled using chemical sorbent materials. Each of these techniques, however, carries the disadvantages previously mentioned relating to significant disturbance of the soil and difficulty in fully surrounding (or encapsulating) a leaking waste tank or region of contaminated soil.

At this time, no chemically reactive material has been proposed or disclosed for the sequestration of selenium.

A need remains, therefore, for a method for sequestering selenium, and in particular, an in situ method of forming a permeable reactive barrier or zone to selenium.

SUMMARY OF THE INVENTION

According to a an embodiment of the disclosure, a composition for sequestering selenium is disclosed that includes 0.1 M to 0.5 M calcium citrate; 0.01 M to 0.3 M sodium citrate; a phosphate reagent having a phosphate ion ratio to calcium in the composition of between about 4 to about 8 parts phosphate to about 10 parts calcium; and a stannous compound.

According to another embodiment of the disclosure, a method for sequestering selenium is disclosed that includes introducing a modified apatite into a material, and contacting the selenium with the modified apatite under conditions by which the selenium is absorbed by the apatite.

According to another embodiment of the disclosure, a method for removing selenium from a fluid is disclosed that includes contacting the fluid with stannous modified apatite to absorb selenium into the stannous modified apatite.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
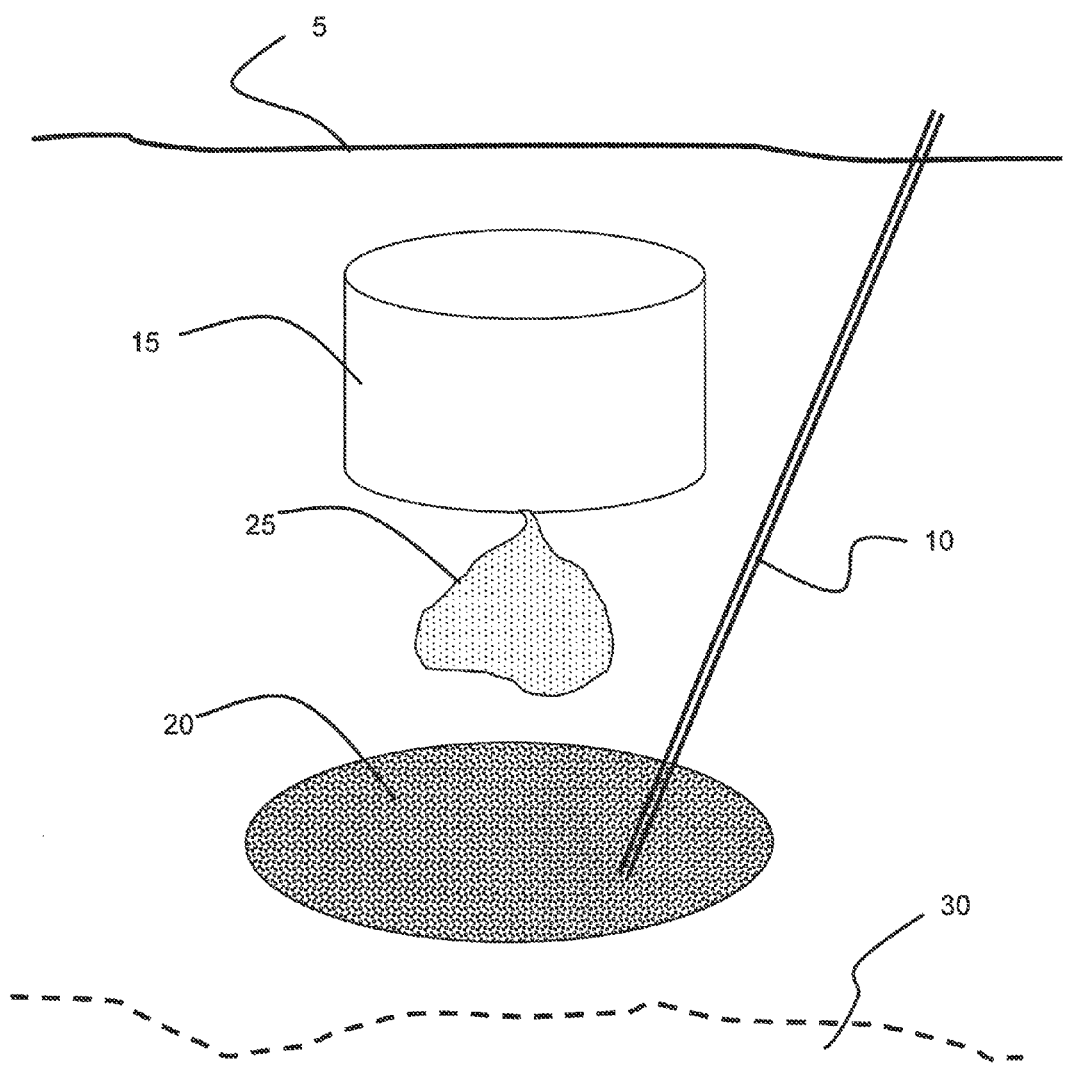
FIG. 1 is a schematic illustration showing a side view of how chemical solutions are injected into soil below a containment vessel to form a reactive barrier capable of preventing downward migration of selenium.

The present disclosure is directed to methods for the absorption and/or stabilization of selenium from a material by apatite. The term "material" includes fluid and/or solid materials. The term "apatite" as used in this disclosure includes apatite, hydroxyapatite and substituted hydroxyapatite. Substituted hydroxyapatite compounds may include, but are not limited to $CO_3^{2-}$ and $HPO_4^{2-}$ for $PO_4^{3-}$, $Na^+$, $K^+$, $Li^+$, $Mg^{2+}$, $Pb^{2+}$, $Sr^{2+}$, for $Ca^{2+}$ and $F^-$ and $Cl^-$ for $OH^-$. Fluids may include streams, groundwater aquifers, holding tanks. Materials may include soils, tailings, overburden, grouts.

Apatite may be introduced into the material by directly introducing apatite into the material or by forming apatite in the material. Apatite may be directly introduced into the material by jet grouting, trenching, or other material introduction technique.

Apatite may be formed in the material by the introduction of apatite forming constituents or reagents into the material in the presence of microorganisms. The apatite forming constituents may be mixed before introduction into the material or may be co-introduced into the material.

The apatite forming constituents include a chelate and a phosphate. The chelate may be calcium citrate. Chelates other than calcium citrate can be used as a biodegradable ligand for calcium, e.g., lactate, EDTA, isosaccarinic acid and other organics. In general, any organic, preferably acid, chelate that complexes with calcium may be employed.

The phosphate is a phosphate salt. The phosphate salt is selected from a group including, but not limited to sodium phosphate and potassium phosphate.

The phosphate reagent and chelated calcium reagent are not initially reactive, however, due to binding of the calcium by the chelate. Subsequently, over time, free calcium is slowly released from the chelated calcium reagent and becomes available to react with the phosphate reagent to form apatite. The rate of release of free calcium by biodegradation of the chelate may be controlled, for example, by modulating microbial action, such as by concurrent or sequential injection of microbial nutrients, or by control of the local temperature. Elevated temperatures and radiation can accelerate the process of releasing free calcium from the chelated calcium reagent. The $Ca^{2+}$ phosphate formation will also naturally go by itself by shifting the chemical equilibrium. As free calcium reacts with $PO_4^{2-}$ and produces solids, the reaction [Ca free+$PO_4^{2-}$ free→$CaPO_4$] is shifted to the left and more $Ca^{2+}$ is released.

The concentration of the constituents of the apatite solution depends on the soil concentration of exchangeable calcium and magnesium. According to the present disclosure the apatite solution includes calcium citrate, sodium citrate and a phosphate salt. The phosphate salt may be sodium phosphate or potassium phosphate.

The amount of calcium citrate in the solution is between about 0.05 M to about 0.5 M. In an embodiment, the amount of calcium citrate in the solution is between about 0.2 M to about 0.4M. In an embodiment, the amount of calcium citrate in solution is between about 0.2 to about 0.25 M. Citrate is added to the solution so that the amount of citrate in the solution is about twice or more than the molarity of calcium in the solution in order for the calcium to be soluble in water and stable in the presence of phosphate ions.

The amount of sodium citrate in the solution is equal to two times the amount of exchangeable calcium and magnesium present in the sediment to be treated. Sodium citrate is added to the formulation to prevent magnesium and calcium naturally occurring in the sediment from reacting with the phosphate in the apatite forming solution while the apatite forming solution is being injected into the sediment.

The amount of sodium citrate in the solution is between about 0.01 M to about 0.3 M. In an embodiment, the amount of sodium citrate in the solution is between about 0.1 M to about 0.3 M. In an embodiment, the amount of sodium citrate in solution is about 0.2 M. The amount of sodium citrate is approximately twice the amount of calcium citrate and is used to counterbalance the amount of calcium and magnesium in the soil to prevent the phosphate introduced into the soil from reacting with the calcium and magnesium in the soil.

The amount of phosphate ion in solution, added as either or both sodium phosphate or potassium phosphate, is in a ratio to calcium of between about 4 to about 8 parts phosphate to about 10 parts calcium. In another embodiment, amount of phosphate ion in solution is in a ratio to calcium of between about 6 parts phosphate to about 10 parts calcium. In an embodiment, the amount of phosphate in solution is between about 0.06 M to about 0.18 M. In another embodiment, the amount of phosphate in solution is between about 0.8 M and about 0.16 M. In another embodiment, the amount of phosphate in solution is between about 0.1 M and about 0.14 M.

According to the disclosure, calcium must be chelated with citrate in a ratio of 1 mole calcium (2+amount of exchangeable calcium+magnesium in soil) citrate, 0.6 moles of phosphate and the pH adjusted to 7.2 to 7.4. According to an embodiment of the disclosure, an apatite forming solution may contain about 2.2 M calcium-citrate and about 0.12 M sodium phosphate at a pH of about 7.4.

According to the present disclosure, it has been unexpectedly found that the apatite environment and/or the apatite forming constituent solution must include a stannous compound. The stannous compound provides $Sn^{2+}$ ion that reacts with the apatite to form a stannous hydroxide phosphate, $Sn_2PO_4OH$, which results in what may be referred to as a "modified apatite" compound. This compound is only sparingly soluble in water and will slowly release $Sn^{2+}$ ions in the area of the apatite barrier creating a reducing environment.

The stannous compound may be selected from the group of stannous fluoride, stannous chloride, stannous acetate, ammonium stannous fluoride, stannous sulfate, stannous tartrate and stannous phthalate. The stannous compound is present in an amount to provide between about 0.1 and 0.5 moles of Sn for every mole of apatite formed.

A set of experiments was performed using a stannous fluoride treated hydroxyapatite powder in distilled water to sorb selenium. Table 1 lists the experiments performed and the results. Experiment #1 was a blank containing only distilled water and hydroxyapatite powder. Experiments 2 and 3 were hydroxyapatite powder treated with stannous fluoride for 24 hours. Experiments 4 and 5 contained hydroxyapatite powder and distilled water with no stannous fluoride added. Selenium was added as ½ $SeO_4^{2-}$ (2 ppm) and ½$SeO_3^{2-}$ (2 ppm) for a total of 4 ppm for experiment 2, 3, 4, and 5. ICP-MS was used to determine the selenium concentration in each experiment after 24 hours and 2 weeks. For the stannous fluoride treated hydroxyapatite, selenium concentrations significantly decreased whereas for the untreated hydroxyapatite samples selenium concentrations did not significantly decrease. After 2 weeks, sodium phosphate was added to experiments 2, 3, 4 and 5. The sodium phosphate did not increase selenium concentration. In fact, selenium concentrations decreased further. Thus, the experiments show that a stannous phosphate treated hydroxyapatite is a strong sorbent for immobilization of selenium.

TABLE 1

Sorption of Selenium by Stannous Fluoride Treated Hydroxyapatite.

| Experiment Number | Distilled Water (ml) | Hydroxyapatite (g) | Stannous Fluoride (g) | Selenium Added (ppm) | Selenium After 24 hr. (ppm) | Selenium After 2 weeks (ppm) | Sodium Phosphate Added (g) | Selenium After Sodium Phosphate Addition (ppm) |
|---|---|---|---|---|---|---|---|---|
| 1 | 200 | 0.2 | 0 | 0 | 0.348 | 0.0009 | 0 | 0.00058 |
| 2 | 200 | 0.2 | 0.07 | 4 | 0.451 | 0.0258 | 0.02 | 0.00197 |
| 3 | 200 | 0.2 | 0.07 | 4 | 0.475 | 0.0236 | 0.02 | 0.000963 |
| 4 | 200 | 0.2 | 0 | 4 | 3.84 | 3.92 | 0.02 | 3.55 |
| 5 | 200 | 0.2 | 0 | 4 | 3.58 | 3.76 | 0.02 | 3.44 |

The pH of the solution is between about 6.0 to about 10.0. In an embodiment, the pH of the solution may be between about 7.2 to about 7.4.

In an embodiment, micronutrients may be needed for the soil microbes and/or chemicals may need to be added to adjust the soil pH before injecting the apatite forming solution. In an embodiment, the site chemistry may have chemicals that retard the formation of apatite so we would add fluoride or another compound that enhances apatite formation. i.e. the formulation is site specific. The addition of these constituents to the solution and/or to the soil into which is solution is to be introduced to create and/or enhance a reduction environment for enhancing apatite formation is discussed in detail below.

The microorganisms in the soil digest and biodegrade the chelate, thereby releasing free calcium, which reacts in situ with the phosphate salt to form a permeable reactive material including apatite. The citrate is metabolized by microorganisms in the soil or groundwater. In an embodiment, a microbial nutrient may be utilized to accelerate the biodegradation process. The microbial nutrient may be a nitrate or phosphate compound. The nitrate may be selected from a group including, but not limited to sodium nitrate, potassium nitrate, and ammonium nitrate. The phosphate may be selected from a group including, but not limited to ammonium phosphate. In general, any source of nitrogen nutrients that microbes can utilize may be used.

The apatite forming constituents and stannous compound may be introduced into the material by well injection, pouring the constituents upon the spoil and allowing the constituents to soak into the soil, or by other introductory techniques.

In another embodiment, the phosphate reagent and a chelated calcium reagent can be injected in a dry, powder form, and water can be injected later or the reagents can dissolve in preexisting groundwater.

According to the present invention, a reduction environment is formed, created, present in the material, or a combination thereof. The reduction environment reduces the selenium and allows the selenium to be absorbed by apatite. In an embodiment, a chemical reducing agent may be introduced into the material to create a reducing environment. The chemical reducing agent may be selected from a group including, but not limited to Fe(II) compounds, sodium thiosulfate, sodium dithionite.

In another embodiment, the reducing environment may be created by adding microbial nutrients and/or microorganisms to the material. The microbial nutrient may be selected from a group including, but not limited to nitrates and phosphates. The nitrate may be selected from a group including, but not limited to sodium nitrate, potassium nitrate, and ammonium nitrate. The phosphate may be selected from the group including, but not limited to ammonium phosphate. In another embodiment, any source of nitrogen nutrients that microbes can utilize may be utilized.

In another embodiment, the reducing environment may be caused by naturally occurring microorganisms or chemical compounds in the material. In an embodiment, any number of a wide variety of known microbial nutrients may be utilized to accelerate the biodegradation process and create and/or enhance the reduction environment. The nutrients may include nitrates, such as sodium nitrate, potassium nitrate, ammonium nitrate, or ammonium phosphate. In general, any source of nitrogen nutrients that microbes can utilize may be used.

According to an embodiment of the disclosure, a method of sequestering selenium in overburden or mine tailings is disclosed. In this disclosure, the term "overburden" means any soil or sediment that is removed in a mining operation. According to this method, the amount of selenium released from the overburden is reduced by first capping the overburden with a liner such as plastic, clay or another suitable material. Capping the overburden prevents water an $O_2$ from permeating the overburden. Capping provides for an anaerobic condition or environment in the overburden so as to provide a reducing environment in the overburden.

In another step, apatite and the stannous compound are introduced into the overburden. The apatite and stannous compound may be introduced into the overburden by directly injecting apatite or by injecting apatite forming constituents into the overburden by a method such as jet grouting, trenching and backfilling, or other similar technique. The stannous compound may be introduced by any of these steps. This step may take place before or after capping of the overburden. In another embodiment, apatite may be introduced into the overburden by pouring apatite or apatite constituents onto the surface of the overburden. In this embodiment, penetration of apatite or apatite constituents and/or stannous compound may be facilitated by the application of a liquid, such as water, to the overburden surface.

In an optional step, the reducing environment may be initiated or enhanced by the addition of a reducing agent. The reducing agent may be a chemical, a microbial nutrient, or microbes as described above. The reducing environment may be created as discussed above by injecting a reducing agent into the overburden, injecting a microorganism and/or microbial nutrient into the overburden, or by allowing naturally occurring microorganisms to form a reducing environment. It should be noted that selenium in its reduced chemical form is less water soluble that in its oxidized form.

In an embodiment, zirconium may be injected into the overburden to form another permeable reactive barrier and/or to enhance the apatite barrier. Zirconium strongly sorbs selenium in both oxidation states.

In another embodiment of the disclosure, another method of sequestering selenium in overburden or mine tailings is disclosed. According to this method, a permeable reactive barrier of apatite is formed in the sediment around the overburden. According to this method, the overburden is capped with a liner such as plastic, clay or another suitable material. Capping the overburden prevents water an $O_2$ from permeating the overburden. Capping provides for an anaerobic condition or environment in the overburden so as to provide a reducing environment in the overburden.

In another step, apatite and the stannous compound are introduced into the overburden. Apatite may be introduced into the overburden by directly injecting apatite for apatite forming constituents into the sediment around and/or under the overburden by a method such as jet grouting or other similar technique. The stannous compound may be introduced by any of these methods. This step may take place before or after capping of the overburden. In another embodiment, apatite and the stannous compound may be introduced into the sediment around the overburden by pouring apatite or apatite constituents onto the surface of the overburden. In this embodiment, penetration of apatite or apatite constituents and the stannous compound may be facilitated by the application of a liquid, such as water, to the apatite applied surface.

Next, in an optional step, the reducing environment may be initiated or enhanced in the sediment around and/or under the overburden by the addition of a reducing agent. The reducing agent may be a chemical, a microbial nutrient, or microbes as described above. The reducing environment may be created as discussed above by injecting a reducing agent into the sediment, injecting a microorganism and/or microbial nutrient into the sediment, or by allowing naturally occurring microorganisms in the sediment to form a reducing environment.

According to another embodiment of the present disclosure, the present invention also relates to the formation in soil of a permeable reactive barrier or zone including apatite. The apatite selectively traps and removes selenium from the soil, while allowing water or other compounds to pass through. Apatite and a stannous compound are introduced into the soil by any of the methods as discussed above. The apatite and stannous compound may be introduced around and/or within the selenium contaminated soil to form an apatite environment. Additionally, a reducing environment is present, introduced and/or enhanced in the apatite environment by any of the methods as discussed above.

The word "soil" is defined herein to be any underground material that is capable of supporting transport, migration, movement, or diffusion of selenium by groundwater or other underground fluids or gases. The word "barrier" is defined herein to be an underground zone or region where selenium is selectively sequestered, sorbed, or adsorbed through chemical reactions and physical effects. The barrier can be permeable to groundwater flow, semi-permeable, or impermeable. The phrase "in situ formation" is defined herein to include in situ formation inside of a container, such as a tank containing hazardous wastes located above ground, or buried under the ground. The permeable reactive barrier selectively binds, traps, and/or sequesters selenium, where the word "selectively" refers to specific, targeted contaminants that are sequestered, while allowing water and other untargeted contaminants to pass through the permeable barrier.

In an embodiment, the present disclosure is directed to the formation of apatitic permeable reactive barriers (PRB's). Apatite is very water insoluble and thermodynamically very stable, and therefore advantageous as a sequestration barrier material because of its resistance to degradation in the presence of natural corrosive elements, including water.

A fundamental chemical reaction underlying the in situ formation of apatite for permeable reactive barriers, according to the present invention, involves combining a phosphate, such as sodium phosphate ($Na_3PO_4$) or potassium phosphate with a salt, such as $CaCl_2$, wherein the salt has formed in-situ from microbial decomposition (i.e., digestion) of an organic acid chelate, such as citric acid, chelated to the salt. The addition of an organic acid (e.g., citric acid) slows down the formation of apatite crystals, which eliminates the need to mix calcium chloride and potassium phosphate underground (if mixed aboveground, the solid precipitates could clog up the injection apparatus). Consequently, the chelated calcium reagent and the phosphate reagent can be premixed above ground without fear of prematurely forming the phosphate precipitate, and then easily injected as an aqueous solution into the contaminated soil. The stannous compound may be premixed or added at a later time. Conditions of pH, temperature, and reactant dilution affect the rate of reaction and success with which apatite is formed. If the proper conditions are not present, then apatite compounds will not form. For example, combining calcium and phosphate ions at concentrations greater than 10 mM will not form apatite at room temperature or colder.

Apatite is a forgiving family of minerals in that strict adherence to stoichiometric proportions is not necessary when combining reactants to form an effective permeable reactive barrier, especially where dilute reactants are injected at basic pH and elevated temperature. The use of aqueous solutions enables the reactants to diffuse through the soil some distance before free calcium becomes available through degradation of the chelate, whereupon the phosphate and calcium harden to form the phosphate precipitate. The outward diffusion of the two reagents prior to reacting permits a larger volume of soil to be treated. This is to be contrasted with the situation where solutions containing free calcium and free phosphate are simultaneously injected in the same hole and mix underground to rapidly react and form apatite. In this latter case, a much smaller volume would be treated.

In applying the method to actual cases of soil contamination, it is advantageous to ascertain the temperature and pH characteristics of the target soil prior to injection of reagents. Using that information, it is possible to adjust the reagent formulations and conditions so that they exhibit the optimum pH and temperature characteristics according to the invention as the reagents diffuse through the soil and react with each other. At a pH of between 7 and 9 in the soil, the conditions for forming apatite are most favorable. However, the pH of the solution that is injected might be less than 7 or greater than 9, depending on the pH of the soil prior to injection.

Likewise, it is advantageous to ascertain and consider physical characteristics of soil, including the degree of compaction of the soil and presence of moving groundwater in the soil. This information can be used to appropriately adjust the injection pressure or select a suitable alternate injection method. If, for example, a predominant direction of groundwater flow is apparent, this can be used to advantage in dispersing the reagents into a specific soil region wherein a permeable reactive barrier is desired. Following are example embodiments illustrating various approaches to introducing reagents into soil according to the principles of the invention.

Using the methods of this invention, a phosphate reagent and a chelated calcium reagent are employed, and may be co-administered at a single site, in a borehole, or the like. The chelated calcium can include a biodegradable chelate, e.g., a biodegradable organic acid chelate. The chelate can be citrate, such that calcium citrate is utilized. Chelates other than citrate can be used as a biodegradable ligand for calcium, e.g., lactate, EDTA, isosaccarinic acid and other organics. In general, any organic, preferably acid, chelate that complexes with calcium may be employed.

Naturally occurring microorganisms in the soil can digest and biodegrade the chelate, thereby releasing free calcium, which reacts in situ with the phosphate reagent to form a permeable reactive material comprising calcium phosphate (including apatite or hydroxyapatite under the proper conditions). The citrate is metabolized by microorganisms in the soil or groundwater. Thus any of a wide variety of known microbial nutrients may be utilized to accelerate the biodegradation process, including nitrates, such as sodium nitrate, potassium nitrate, ammonium nitrate, or ammonium phosphate. In general, any source of nitrogen nutrients that microbes can utilize may be used.

Formation of apatite optimally occurs at a pH from about 7 to about 9. Thus any of a wide variety of well-known reagents may be employed to adjust the pH to the optimal range, such as a carbonate buffer or a phosphate buffer. In one embodiment, pH-adjusting reagents can be delivered subsequent to injecting the solution of phosphate and chelated calcium, and may further serve to disperse the phosphate and chelated calcium over the desired area. Nutrients to enhance microbial action may be administered prior to, with or subsequent to administration of pH adjusting reagents.

Formation of apatitic occurs more rapidly and more completely at elevated temperatures (e.g., 60-100 C). Heating of the chelated calcium and phosphate reagents is not required to form apatite, since the release of free calcium due to microbial digestion generally occurs slowly over time, thereby producing low concentrations of free Ca. According to an embodiment of the disclosure, the sediment and or apatite forming solution may be heated to increase the rate of apatite formation.

The addition of a fluoride reagent selected from the group of sodium fluoride or potassium fluoride may be used to enhance conditions for apatite formation. This fluoride reagent may be administered with the phosphate and chelated calcium, or subsequent thereto.

In one embodiment of the present invention, the sodium phosphate concentration can be in the range of about 0.00001 M to about 1 M. In another embodiment of the present invention, the concentration of chelated calcium can be in the range of about 0.00001 M to about 1 M. In another embodiment of the present invention, the ratio of calcium atoms to phosphate atoms in the solution can be about five to three (5:3).

In one embodiment, an aqueous solution comprising a mixture of 100 mM citrate, 50 mM calcium chloride, and 30 mM sodium hydrogen phosphate is premixed, for subsequent injection into the soil. The citrate and calcium chloride form a calcium citrate complex or chelate, thereby rendering the calcium unavailable for immediate reaction with the phosphate. A nitrate compound, such as 10 mM of ammonium nitrate, may be added to enhance microbial metabolism. Similarly, 20 mM of sodium fluoride may be added to enhance in situ apatite formation. Herein, the notation "1 M" means an aqueous concentration of 1 mole/liter, and "1 mM" means $10^{-3}$ moles/liter.

A reducing agent is also employed. Suitable reducing agents include Fe (II) or Sn (II) reducing agents, such as $SnCl_2$ or $FeCl_2$. These reducing agents may be employed with the phosphate and chelated calcium reagents of this invention, or may be employed with any other method for introducing apatites to form in situ barriers or reactive zones. In one embodiment, subsequent to introduction of phosphate and chelated calcium reagents, and optimally subsequent to introduction of microbial nutrients and fluoride reagents, a suitable Fe (II) or Sn (II) reagent is introduced. Such introduction may be by the same means employed to introduce other reagents, such as by means of low or high pressure injection, dispersion over a soil layer, or other means.

In an embodiment, a single injection hole may be used for the injection of the constituents of the method, and where the permeable reactive barrier or zone provides complete or near-complete containment and immobilization of selenium in contaminated soil or groundwater FIG. 1 illustrates an embodiment of the present invention wherein a waste tank containing selenium is encapsulated with apatite using principles of the invention. Referring to FIG. 1, a waste tank 15 is shown in side view, buried in soil beneath the soil surface 5. A borehole or injection well 10 through which chemical solutions are injected from the surface 5 is provided. The injection well 10 need not have a large diameter; rather it need be only of sufficient cross-sectional size to permit injection of aqueous solutions into a region in proximity to the waste tank 15, as shown in FIG. 1. Injection may be accomplished by pumping the solution or solutions directly through the injection well 10, or alternatively, by pumping reactant solutions through injection pipes positioned in the injection well 10. In any case, the injection well 10 provides for penetration of the soil from the soil surface 5 to the region proximate to the waste tank 15, as shown. In this embodiment of the present invention, the permeable reactive barrier can be formed without significant detriment to soil stability.

The diameter and other physical characteristics of the injection well 10 and the method for creating the injection well in the soil will depend on various factors such as degree of soil compaction, physical constituents in the soil, and so forth. In one embodiment, an injection well may be made by driving an injection pipe into the ground, if soil conditions will accommodate this. In other instances, it may be necessary to dig or drill to create the necessary injection well. If required for the desired dispersion pattern, more than one injection well 10 may be employed at a given site.

According to this embodiment, reactants of suitable pH and temperature (according to the principles explained above) are injected through the injection well 10. Injections can be directed so that when the chemical reactions forming the phosphate precipitate take place, the tank 15 can be substantially surrounded or encapsulated by the phosphate precipitate. As noted, when the reactants in aqueous solution enter the soil, they tend to migrate as a result of capillary action through the soil. This capillary action is also responsible for causing the reactants to disperse in situ, thereby causing the formation of the apatite barrier over the desired area. Likewise, as noted, other factors including injection pressure and groundwater movement contribute to movement of the aqueous solutions, thereby causing formation of the apatite barrier over the desired area.

In FIG. 1, a permeable reactive barrier 20 is shown which generally forms a barrier under waste tank 15, preventing downward migration of the selenium containing contaminant plume 25 into groundwater 30. It is contemplated that a plurality of injection wells 10 may be used, but the necessary number and orientation of the injection well 10 will depend on specific circumstances and conditions present concerning, for example, the waste to be encapsulated and the given soil conditions. To achieve optimal sequestration, precise placement of injection wells is not needed so long as qualitatively the permeable reactive barrier 20 that is formed substantially halts migration of the selenium.

In the illustration of FIG. 1, a leaking waste tank is shown (see plume 25), however, the principles of the invention are equally applicable where a plume containing selenium is present in the soil. Due to the reactive nature of the apatite barrier formed, movement of selenium can be arrested, and effective sequestration can be accomplished in a wide range of instances where the barrier is formed in situ around and even in the midst of contaminant species.

Figure 2:
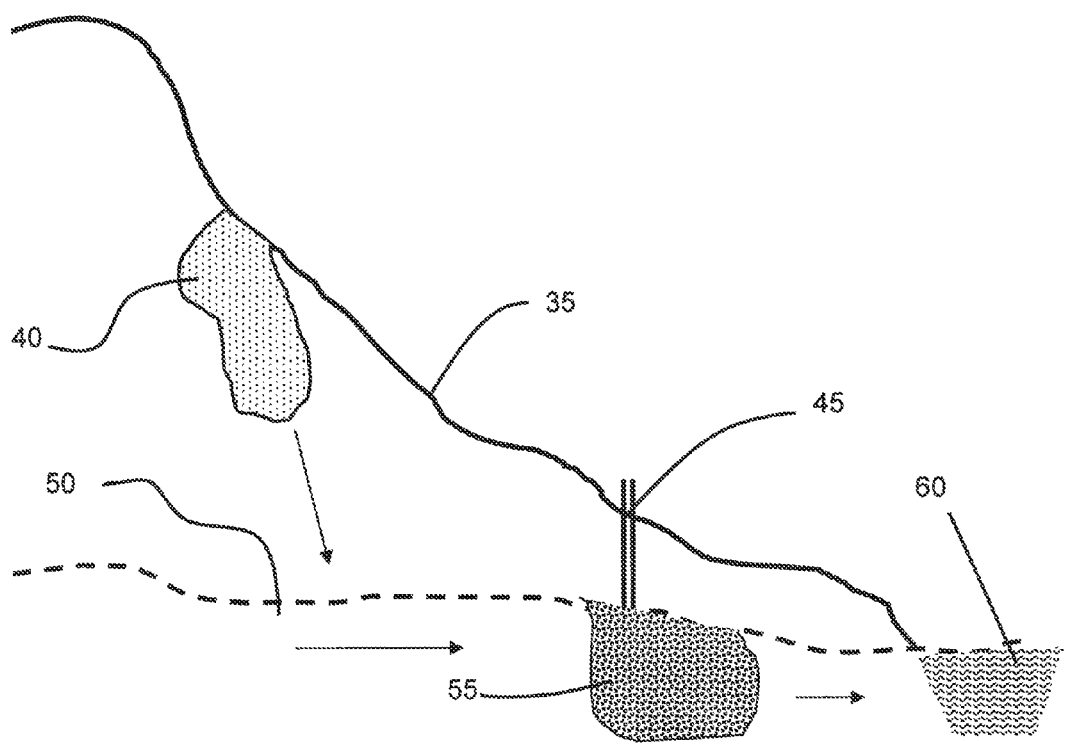
FIG. 2 is a schematic illustration showing an alternative to the embodiment shown in FIG. 1, but wherein a modified apatite barrier of this invention prevents migration of waste into a river.

FIG. 2 illustrates an embodiment wherein the chemical reaction and injection principles described in the disclosure can be used to form a wall to obstruct migration of selenium. In the illustration, selenium from a waste site or plume 40 (such as in a waste trench) or other contaminant source pose a risk associated with movement toward water such as a stream or river 60. In the illustrated example, an apatite barrier 55 is interposed between the plume 40 and river 60 according to the same principles described elsewhere in the present application. By drilling beneath ground surface 35 by use of well hole or bore 45, an aqueous solution of calcium citrate, phosphate and a stannous compound are introduced, resulting in apatite permeable reactive barrier 55 in aquifer 50, which aquifer 50 represents the migration path of waste. In addition to calcium citrate, phosphate, and a stannous compound, additional fluorides and microbial nutrients can also be introduced through bore 45. Such introduction, including introduction of calcium citrate and phosphate, can be cycled or repeated as desired to result in apatite barrier 55 of desired size and density. The apatite permeable reactive barrier 55 permits water to pass through, but selectively sorbs and removes selenium, which binds to the apatite.

This embodiment illustrates that although the method of the present invention can sequester selenium sources by encapsulation, in situ formation of phosphate barriers (especially apatite) can be of benefit even where other barrier configurations, like walls, are used. Depending on the injection techniques used and the barrier required or desired, walls of this sort may be created at various depths. The invention method is useful for forming barriers at depths in excess of thirty feet, for example, where digging traditional trenches (and then filling them with a barrier material) to isolate waste is not a favored approach or perhaps even feasible. Problems with trenches of such depth result because they may need to be very wide depending on soil conditions in order to satisfy engineering and safety considerations. Costs and safety risks, including those associated with radiation hazard, are likely to be significant when such large trenches are dug. The barrier formation method of the present invention is not subject to geometric limitations of the sort associated with trenches.

Figure 3:
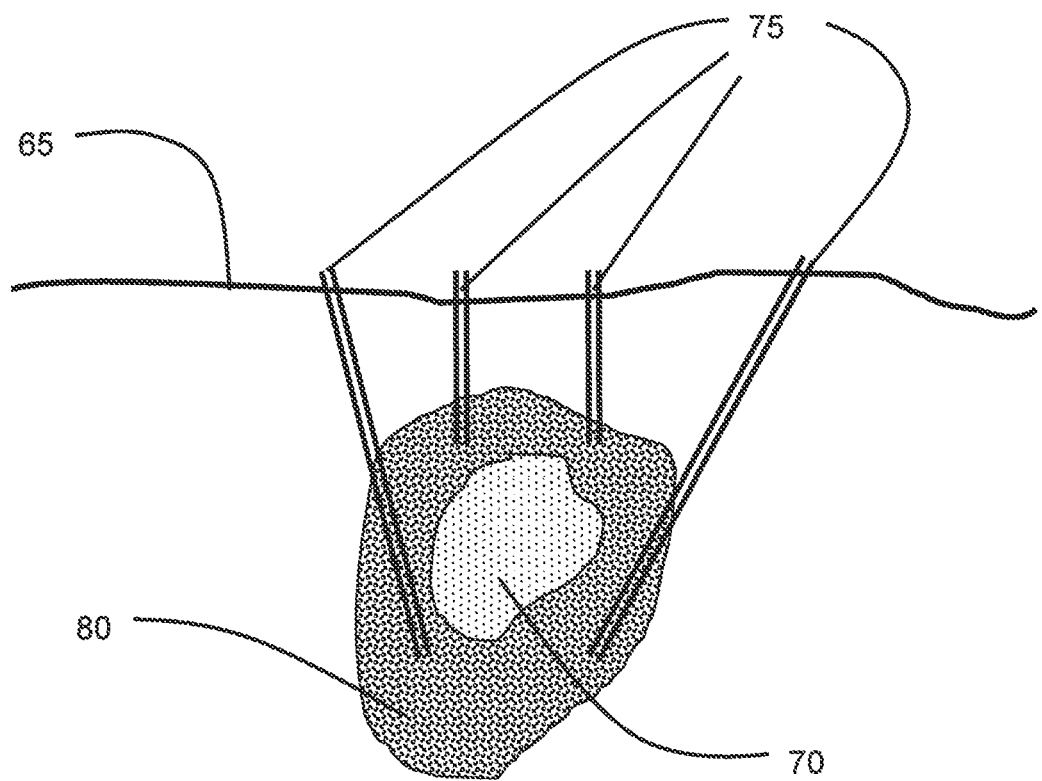
FIG. 3 is a schematic illustration showing completely surrounding a buried waste source with a modified apatite barrier.

FIG. 3 depicts a side view of a buried waste site 70 completely below ground surface 65. Such waste site 70 is completely encapsulated by utilizing a multiplicity of well holes or bores 75, through which calcium citrate, phosphate and a stannous compound, and optionally fluorides and microbial nutrients, are introduced, resulting in encapsulating apatite barrier 80.

Heat (consistent with the temperature ranges noted throughout this disclosure) can be applied to increase the rate of apatite formation. Heat can be introduced to system using pipes (e.g., metal pipes). Since the reagent solutions are electrolytes, electricity can be conducted between two adjacent wells, thereby generating resistance heating in situ. (Heron, G., M. V. Zutphen, T. H. Christensen, and C. G. Enfield, Soil Heating for Enhanced Remediation of Chlorinated Solvents: A Laboratory Study on Restive Heating and Vapor Extraction in a Silty, Low-Permeable Soil Contaminated with Trichloroethyene. Environ. Sci. Technol. 1998, 32, pp. 1474-1481). Alternatively, hot gas or gases, water, or steam can be pumped into an injection well and recovered from a recovery well to heat the soil.

Finally, it is noted that although the previously described embodiments focus on injecting reagents into the soil (albeit, even at low pressure), the necessary migration in situ can occur likewise in instances where reagents are simply poured on the surface of soil. This is because many of the physical principles causing percolation of reagents through soil apply regardless of whether the reagents are actively or passively introduced into the soil. Therefore, it is anticipated that certain applications wherein the principles of the invention are advantageous or desirable include relying on the option of simply pouring reagents in locations where migration of the reagents in the soil results in the requisite migration in situ in the soil. Therefore, unless otherwise specified or necessitated by context, the terms inject, injecting and injection are intended to encompass passive methods of introducing reagents into soil including simply pouring them on the soil surface. Similarly, the reagents may be introduced, by injection or other means as described, as a powder or slurry, and water or another suitable fluid subsequently introduced, by the same or different means, to disperse the reagents and to effect the desired molar concentration of reagents over the desired area.

According to another embodiment of the disclosure, modified apatite may be used to prevent the spread of selenium into groundwater and/or soil from a leaking or ruptured fluid holding tank. In this embodiment, apatite or apatite forming constituents may be injected or introduced into the soil or sediment surrounding or under the holding tank to form a permeable reactive barrier to prevent the spread of selenium. The apatite or apatite forming constituents may be introduced as disclosed above.

According to another embodiment of the disclosure, apatite may be used as a filter media or sorbent in a fluid treatment system to remove selenium from a contaminated fluid. For example, selenium may be used as a filter media in a filter or column in a pump and treat system that is used to remove selenium from groundwater, ponds, streams, coal and other mineral mine tailings ponds, coal fly ash impoundments, and fluid tanks. The filter column may be external to or submersed within the body of the contaminated fluid.

In an embodiment, the apatite filter arrangement may be as disclosed in U.S. Pat. No. 7,514,004, incorporated herein in its entirety. The fluid may be treated and returned to the fluid tank, another fluid tank, or introduced into a well, containment pond or stream. In this embodiment, the fluid would be treated, if necessary, to have its pH adjusted before being placed in contact with the apatite. The pH may be in the range of about 6.0 to about 10.0 In an embodiment, the pH may be in the range of about 7.2 to about 7.4.

The invention is further illustrated by the following non-limiting examples.

Example 1

Figure 4:
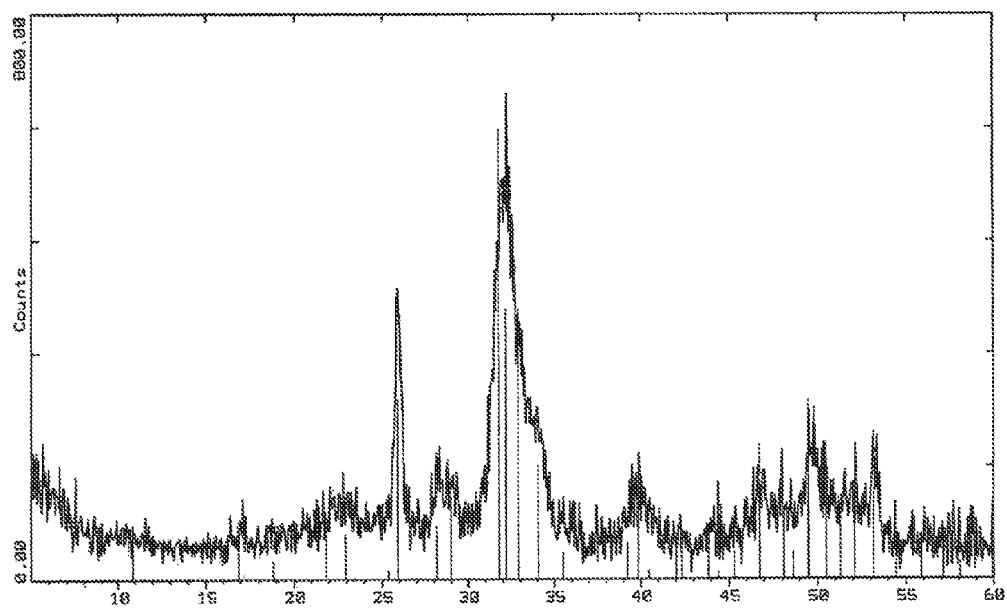
FIG. 4 is a plot of an X-ray diffraction pattern for apatite formed in situ using calcium citrate and sodium phosphate.

100 mM sodium citrate, 50 mM calcium chloride and 30 mM sodium hydrogen phosphate ($Na_2HPO_4$) at an initial pH of 8.5 were mixed and injected into soil from the Albuquerque area. The sodium citrate reacts with the calcium chloride to form calcium citrate plus NaCl. 10 mM nitrate was added to enhance microorganism metabolism, and 20 mM sodium flouride was added to enhance apatite formation. Over a two-week reaction period, the pH decreased to pH 7.4. FIG. 4 shows the resulting X-ray diffraction pattern of the material precipitated into the soil. The vertical lines in FIG. 4 are X-ray diffraction peak signatures for apatite. The measured X-ray diffraction pattern matches very well with that of apatite.

Example 2

Solutions of low concentration, 0.001 M of sodium citrate, 0.001 M of sodium phosphate, and 0.001 M calcium complexed to the citrate were mixed. After 2 weeks, 90% apatite was formed.

Example 3

Solutions with higher concentrations, 0.1 M of sodium citrate, 0.1 M of sodium phosphate, and 0.001 M calcium complexed to the citrate were mixed. After 2 weeks, 80% apatite was formed.

In another embodiment, apatite may be used to treat a fluid to remove and/or sequester selenium in a continuous or batch process. The fluid may be from, but not limited to a stream, pond, aquifer, or tank. In this embodiment, apatite is introduced into the fluid in a reducing environment that is either present or created as discussed above. For example, apatite along with a reducing agent described above is directly added to a tank containing a selenium bearing fluid to treat a fluid to remove and/or sequester selenium. In an embodiment, apatite may be placed in a tank within a permeable or mesh bag, and the reducing agent added, allowing the apatite to react and sequester the selenium. The bag may then be pulled out for disposal.

According to another embodiment, apatite is used to treat a solid or semi-solid material. In this embodiment, a selenium containing material is treated by adding apatite to the material. The material and apatite may be mixed to distribute the apatite throughout the material. The material needs to be a reducing environment, which may be present in the material or which may be created or enhanced as discussed above. The material may be further mixed with a cement or grout. The treated material may then be stored in a cask or container.

In another embodiment, the migration of selenium can be prevented at locations where solution mining or in-situ leaching is currently being or has been employed to recover uranium. The solution mining of uranium is accomplished by drilling wells into a uranium-bearing geologic formation and then injecting oxidizing solutions or acidic solutions into the formation. The solutions release uranium into solution and these uranium bearing solutions are then pumped back to the surface where the uranium is separated from solution and the water is then returned underground. This solution mining process releases contaminants including selenium into solution. In order to prevent the migration of these contaminants, the apatite reagents described above may be injected into geologic formations to form a permeable reactive barrier. It should be noted that the apatite also may absorb other contaminants such as, but not limited to uranium, radium, etc.)

In another embodiment, water resources may be protected at locations where hydraulic fracturing or hydrofracking is currently being or has been employed to produce hydrocarbons from materials (geologic formations in this case). In this process high pressure water is pumped down a well to fracture the hydrocarbon bearing rock underground. The fracturing process creates pathways for the hydrocarbons to flow and then be pumped back to the surface for collection. The water can release selenium and other contaminants (uranium and radium) present in the rock which can be carried to the surface or to other geologic formations with groundwater suitable for human consumption. The migration of these contaminants to the surface or to adjacent geologic formations can be prevented if the reagents described above are injected into hydrocarbon bearing formations to form a permeable reactive apatite barrier.

In a closely related embodiment, apatite filter media can be injected with the hydraulic fracturing fluids or slick waters used to induce hydraulic fracturing. In this case, granular sand-sized particles (0.1 mm to 2 mm in diameter) of apatite are injected as a component of hydraulic fracturing fluids or slick waters. The apatite acts as a proppant to keep fracture spaces open during shale gas production and as a sorbent to remove selenium and other contaminants (uranium, thorium, radium etc.) preventing these metals from reaching the surface and other geologic formations during fluid flowback and/or recirculation.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for sequestering selenium, comprising:
   introducing a stannous modified apatite into a material, wherein Sn is present in an amount of between 0.1 and 0.5 moles for every mole of apatite;
   contacting the selenium with the stannous modified apatite under conditions by which the selenium is absorbed by the stannous modified apatite.

2. The method of claim 1, wherein the conditions comprise a reducing environment.

3. The method of claim 1, wherein the stannous modified apatite is introduced into the material by adding apatite particles to the material.

4. The method of claim 1, wherein the stannous modified apatite is introduced into the material by introducing a solution comprising apatite forming constituents into the material.

5. The method of claim 4, wherein the solution further comprises tin ions.

6. The method of claim 4, wherein the solution is injected into the material.

7. A method for removing selenium from a fluid, comprising:
  contacting the fluid with stannous modified apatite to absorb selenium into the stannous modified apatite, wherein Sn is present in an amount of between 0.1 and 0.5 moles for every mole of apatite.

8. The method of claim 7, wherein the stannous modified apatite after absorption of selenium from the fluid is removed from the fluid.

9. The method of claim 7, wherein the stannous modified apatite is formed in situ.

* * * * *